May 28, 1968 A. E. FLANDERS ETAL 3,384,956
MODULE ASSEMBLY AND METHOD THEREFOR
Filed June 3, 1965 3 Sheets-Sheet 1
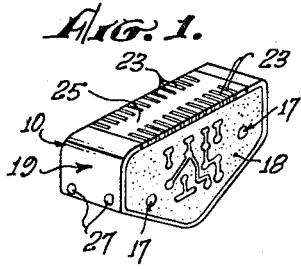
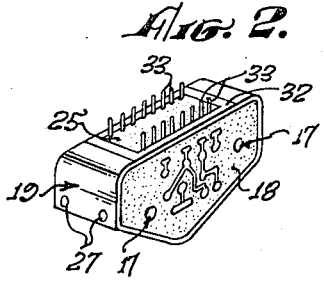
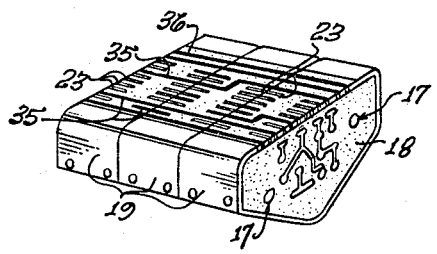
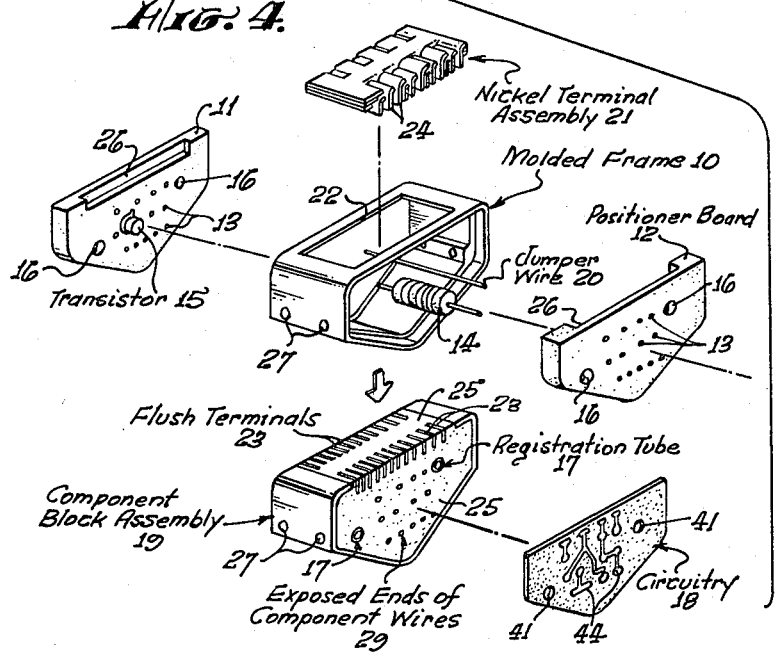
INVENTORS.
ANDREW E. FLANDERS,
JAMES A. PATRICK,
By
ATTORNEY.

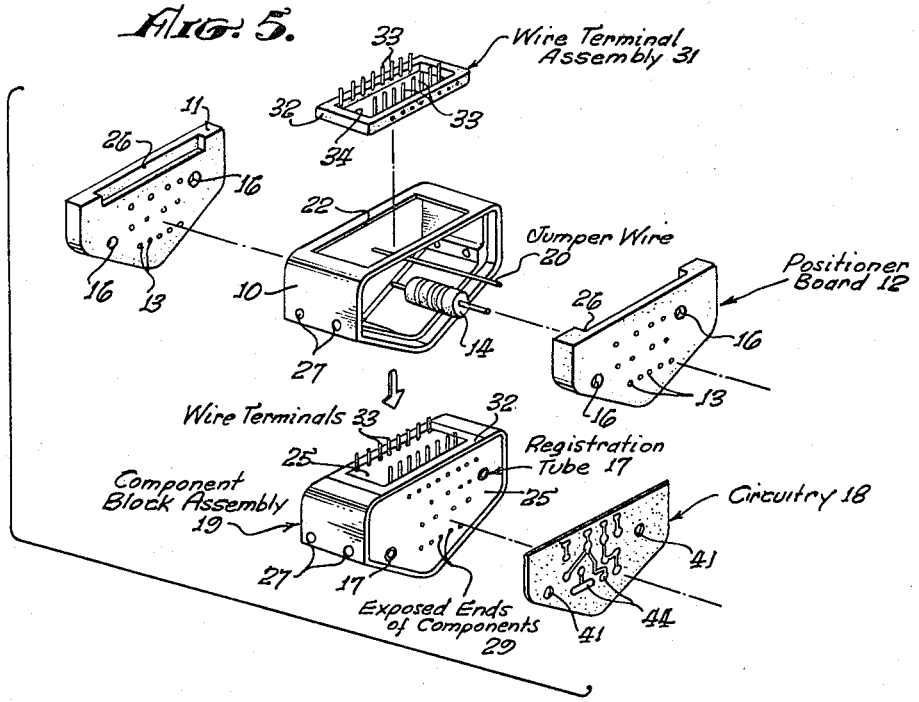
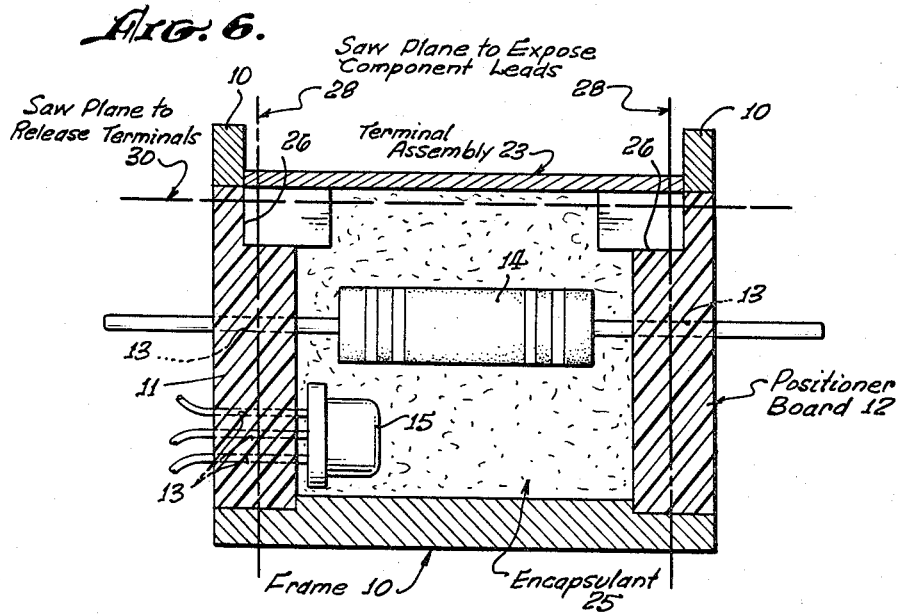

May 28, 1968   A. E. FLANDERS ETAL   3,384,956
MODULE ASSEMBLY AND METHOD THEREFOR
Filed June 3, 1965   3 Sheets-Sheet 3
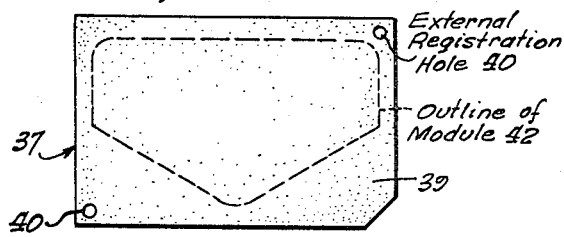
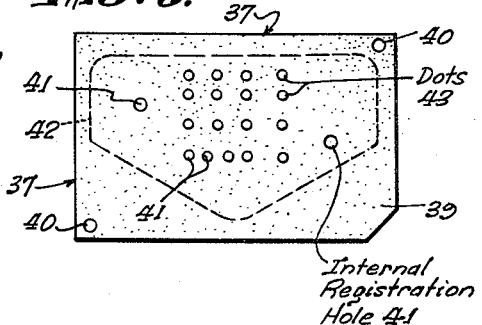
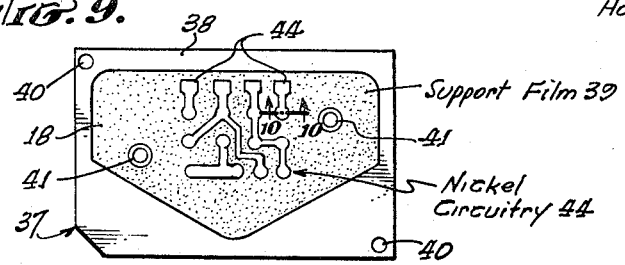
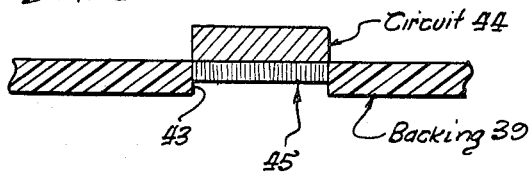
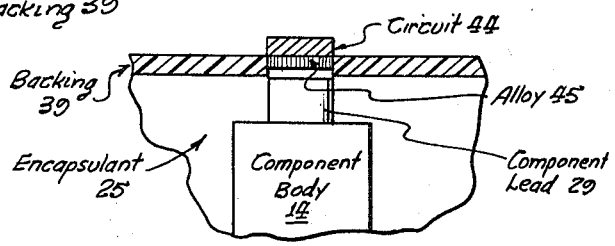
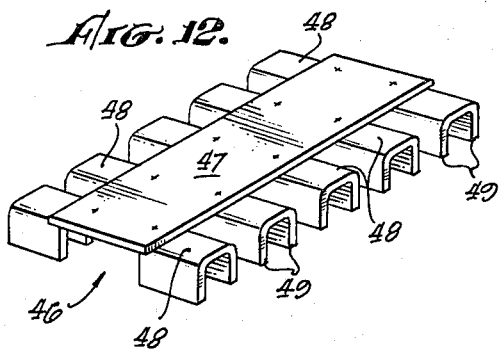
INVENTORS.
ANDREW E. FLANDERS,
JAMES A. PATRICK,
By
ATTORNEY.

United States Patent Office 3,384,956
Patented May 28, 1968

3,384,956
MODULE ASSEMBLY AND METHOD THEREFOR
Andrew E. Flanders, Pomona, and James A. Patrick, Montclair, Calif., assignors to General Dynamics Corporation (Pomona Division), Pomona, Calif., a corporation of Delaware
Filed June 3, 1965, Ser. No. 461,045
6 Claims. (Cl. 29—624)

ABSTRACT OF THE DISCLOSURE

The disclosure involves a manner of connecting electronic components which are stacked in a cordwood configuration and encapsulated in a solid-block module. In addition, a unique preformed circuit arrangement, and method of manufacturing same, is efficiently applied for interconnecting the module components and/or individual modules, the circuit having repairability features when desired.

---

This invention relates to module assemblies, particularly to electronic modules, and more particularly to a method of manufacturing welded electronic modules.

The prior art methods for connecting welded module components involves protruding leads, pre-bent bits of connector ribbon material, and much handling of the assembly prior to encapsulation. The prior known methods also require appreciable relative up-and-down and aligned rotational motion between the module and the welding electrode tips, thus adding difficulty to automatic production.

The method of this invention lends itself to a high degree of mechanization prior to encapsulation; requires no manipulation of small bits and pieces of material; and little relative vertical motion is necessary since the protruding members are eliminated. All relative motion may be confined essentially to the X and Y planes, thus facilitating the use of automatic machinery. Because of the relatively thin dimension of the inventive circuit and its backing of insulating material, more than one layer may be used in case of extremely complex interconnections.

This invention is particularly adapted for modules in which discrete subminiature components are arranged in "cordwood" fashion or other suitable three-dimensional arrangement and positioned by positioner boards which can be molded plastic plates or separable tool plates with holes provided in an appropriate pattern for accurately positioning the component leads relative to each other and to the sides of the module. A circuit which is a planar, separable, and/or non-separable printed circuit is surface welded to exposed ends of the component leads which are terminated substantially flush with the solid-block encapsulated module. The surface welding interconnection is accomplished by providing one surface of the circuit with a coating of fusible metal and fusing these metals with the heat of a suitable welder, thus producing a joint having high-strength which yet may be peeled and replaced a number of times with selection of appropriate diffusion materials and welding characteristics. Surface welding provides an interface bond by mutual diffusion of the coating with the parent material surface without the presence of the subsurface metal in its pure state.

Therefore, it is an object of this invention to provide a method for the assembly of electronic modules.

A further object of the invention is to provide an improved, simplified method of producing connections between components of encapsulated modules.

Another object of the invention is to provide a method of producing module circuitry adapted for surface welding applications due to a coating of diffusion-welding material.

Another object of the invention is to provide a 3-D electronic module so as to substantially reduce the dimensions thereof.

Another object of the invention is to provide a method of assembling 3-D electronic modules which substantially reduces the assembly cost over the prior art methods.

Another object of the invention is to provide a circuit network constructed to overlay external terminals and exposed leads of encapsulated components whereby all the interconnection can be manually or automatically interconnected by welding or diffusion bonding techniques.

Other objects of the invention, not specifically set forth above, will become apparent from the following description and accompanying drawings wherein:

FIG. 1 is a perspective view of a module made in accordance with the invention and utilizing flush type terminals;

FIG. 2 is a view similar to the FIG. 1 module but utilizing wire type terminals;

FIG. 3 is a perspective view illustrating module interconnection utilizing the inventive interconnection circuit assembly;

FIG. 4 is an exploded view illustrating the major elements of the FIG. 1 module embodiment;

FIG. 5 is an exploded view illustrating the major elements of the FIG. 2 module embodiment;

FIG. 6 is a partial cross-sectional view illustrating a portion of the module assembly procedure of the invention;

FIGS. 7 to 9 illustrate portions of the circuit fabrication process in accordance with the invention;

FIG. 10 is an enlarged cross-sectional view of the FIG. 9 circuit taken along line 10—10 thereof;

FIG. 11 is a view illustrating the FIG. 10 enlarged circuit portion positioned for interconnection to a module component; and FIG. 12 is a perspective view of another embodiment of the flush type terminal assembly.

Broadly, the invention involves a manner of connecting electronic components which are stacked in a cordwood configuration and encapsulated in a solid-block module. In addition, the invention provides a unique preformed circuit arrangement and method of manufacturing which may be efficiently applied for interconnecting the module components or individual modules, the circuit having repairability features when desired.

The inventive assembly technique is an improved method of component interconnection which produces a module intermediate in size and component density between the known 3-D welded ribbon modules and integrated circuit packaging. The module made in accordance with the invention are smaller than known 3-D welded ribbon modules for two reasons: (1) edgewise ribbons are eliminated, obviating the need for associated clearance allowances and (2) components may be positioned more compactly since welder tips move perpendicular to the circuit and there are no interfering component ends or ribbons to be insulated from contact with the welder tips. For example, the modules illustrated in FIGS. 1 and 2 have an overall reduction in thickness of approximately 10 percent as compared with welded modules made by known processes. As desirable as size and weight reductions are, a more important advantage of the present method is the reduction in cost achievable through a highly mechanized circuit welding operation. It has been determined that this method will give a cost reduction of approximately 50% for manual assembly and in excess of 75% for mechanized assembly.

Referring now to the drawings, FIGS. 1 and 4 show an embodiment of a module made in accordance with this invention and basically comprising a molded frame 10 of plastic or the like, a pair of positioner boards 11 and 12 each having a plurality of apertures 13 extending therethrough which are adapted to receive the leads of internal components such as exemplified by resistor 14 and transistor 15. Positioner boards 11 and 12 may be constructed of plastic or other suitable material. In addition, boards 11 and 12 are provided with apertures 16 for the reception of registration tubes 17 which function as locator holes for mating the module with locating pins on an associated welder table and registration of the printed circuitry 18 with the component block assembly 19. A jumper wire 20 shown in FIG. 4 is a conductor used within a module to provide a direct connection between opposite faces of the module, namely, positioner boards 11 and 12. A terminal assembly 21 constructed, for example, of nickel is positioned in the cutaway 22 in the top of frame 10 and provides the flush terminals indicated at 23 in the finished component block assembly 19. The terminal assembly 21 as shown in FIG. 4 comprises three sheets of suitable metal which are sheared in L-shaped cuts and the tabs 24 are then bent in the manner shown. The interlocking stack of sheets results in two rows of terminals 23 embedded in the encapsulated finished module.

The positioner boards 11 and 12 serve the following functions in the assembly of the inventive module:

(1) Provide axial positioning of components without special operator attention.

(2) Provide sufficiently accurate location of component leads relative to each other and to the sides of the module.

(3) Position the terminal assembly in the component module.

(4) Position and hold transistors firmly making tab removal and case insulation unnecessary.

The module frame 10 serves the following functions:

(1) Positions and holds the positioner boards.

(2) Positions the threaded inserts which provide for mounting the finished module.

(3) Determines the geometric shape of the module (4 sides parallel to the axes of the components).

(4) In combination with the positioner boards, forms a container for liquid encapsulant and provides mechanical strength to resist the expansive properties of foam encapsulants.

In the assembly of the FIG. 1 module as illustrated in FIG. 4, with positioner boards 11 and 12 provided with the apertures 13 in an appropriate pattern for accurately positioning component leads relative to each other and to the sides of the module to be assembled. The leads of the transistors 15, nonaxial lead components, and other single-ended components are inserted and clenched in the appropriate holes or apertures 13 in the applicable positioner board 11 or 12. The transistors may be mounted without insulating the case thereof because of the precise positioning control achieved with the present method. The leads of all axial lead components such as resistor 14 are inserted in the applicable apertures 13 of the same positioner board, for example board 11, as the nonaxial lead components were installed. The molded module frame 10 is placed over the components 14 and 15. The free leads of the components are inserted through the holes or apertures 13 in the other positioner board 12. The jumper wires 20 are installed, and the positioner boards 11 and 12 are pressed into frame 10. Registration tubes 17, for example rigid plastic, are pressed into the registration holes or apertures 16 in the positioner boards. If desired, blind registration holes may be utilized. The thus assembled module is ready for encapsulation.

The first step in preparing a foam encapsulated module is to seal, via cutaway 22 in frame 10, with liquid epoxy, the crevices around the component leads where they extend through the board apertures 13, and the edges where the positioner boards 11 and 12 mate with frame 10. After the sealing material has cured, the central cavity of the module may be filled with either a rigid or foam potting material indicated at 25. At a suitable time in the encapsulation process, the terminal assembly 21 is placed in recesses 26 in the positioner boards 11 and 12 via the cutaway 22 in the top of frame 10. After the encapsulation material 25 has cured, the module is ready to be trimmed.

Three saw cuts are required in this instance to trim the thus assembled component module prior to the attachment of the circuit boards 19. FIG. 6 shows a cross-section of the FIG. 4 assembled module and the planes of the three saw cuts. A special fixture (not shown) is provided to hold the module for sawing; module mounting holes 27 are utilized to secure the module to the fixture. Two saw cuts 28 are made to trim the sides of the module exposing all the component leads as indicated at 29 and the side surfaces of the terminals 23 of the top-mounted terminal assembly 21. The third cut 30 is made across the top of module frame 10 at right angles to the previous saw cuts 28 exposing the terminal face, the connecting web of the terminal assembly 21 being cut away leaving, for example, twenty (20) individual terminals 23 embedded in the encapsulant 25 of the component block assembly 19, suitable for interconnection with repairable or non-repairable type welded ribbon. The module is now ready for the final assembly process of the circuit attachment described hereinafter.

The FIG. 2 embodiment assembled as illustrated in FIG. 5 is essentially the same as that illustrated in FIG. 1 and assembled in FIG. 4 except for the construction of the terminal assembly. The FIG. 2 embodiment utilizes a wire terminal assembly 31 which consists of a molded frame 32 and a plurality (10 in this illustration) of wires which become wire terminals 33. A mold (not shown) is loaded with ten (10) straight pieces of wire, such as nickel, and then a frame 32 is formed around them. The mold is removed, the wires cut in the center of the frame opening 34 and bent to the position shown to provide, for example, twenty (20) terminals 33 protruding from the top of the frame 32. This assembly 31 is then inserted in the module molded frame 10 during the encapsulation process described above, the top of assembly frame 32 being level with the top of module frame 10. The trimming process described above with respect to FIG. 6 differs for the FIGS. 2 and 5 module in that the saw cut 30 across the top of the module frame 10 is eliminated. The FIG. 2 module is suitable for interconnection with nonrepairable cross-wire type welds of suitable ribbon.

FIG. 12 shows a welded flush type terminal assembly 46 which may be utilized in place of either terminal assemblies 21 or 31, this assembly being similar to the assembly 21 illustrated in FIGS. 1 and 4 except that it is made from only two parts: a support plate 47 and formed terminal units 48. The formed terminal units 48 have a downwardly opening U-shape with the support plate 47 welded across the top of the terminal units. After the assembly has been inserted, encapsulated in the module and trimmed as described with respect to FIG. 6, flush type terminals 49 similar to terminals 23 are produced. This type of terminal assembly offers the advantage of being modifiable to fit various module distribution requirements by providing suitable holding fixtures during welding of the terminal assembly.

As shown in FIG. 3 the inventive circuit process may be adapted for interconnection of electronic modules. A plurality (3 in this illustration) of component block assemblies 19 of the FIG. 1 embodiment are positioned side by side with certain of the flush terminals 23 being interconnected by circuit paths exemplified at 35. The circuit paths 35 are formed on a preformed harness 36 made in the manner similar to that described below with respect to FIGS. 7–9. The circuit paths 35 are interconnected with flush terminals 23 by "surface" welding techniques for a purpose which will become more apparent hereinafter.

The backing material for the circuit paths 35 has been shown in FIG. 3 as being transparent to show the terminals 23 thereunder but need not be in actual practice. This interconnection process offers all of the advantages inherent in printed circuit board applications, i.e., ease in circuit layout and constant interwiring capacitance and inductance. A module may be replaced by either of two methods: (1) the preformed harness 36 may be peeled from the modules 19, in a manner similar to peeling aluminum foil from a package of cheese due to fusible characteristics of the circuit path material, and replaced with a new printed circuit harness or (2) the section of harness 36 connected to a discrepant module 19 may be cut out and a new section of harness surface welded to a replacement module and the circuit paths 35.

The circuitry 18 shown in FIGS. 4 and 5 is manufactured as illustrated in FIGS. 7–9 from laminated board 37 composed of a layer of a suitable conductive metal 38, such as nickel, having a thickness of approximately 0.005 inch and a layer of suitable insulating film material 39 such as polyester having a thickness of between approximately 0.005 to 0.001 inch. The film 39 provides a plating mask, registration means, and supports the strips of circuitry in proper spatial relationship.

The following sequence of operations taken in conjunction with FIGS. 7–9 provide a step by step procedure for producing the circuitry 19.

(1) The raw material, namely, the laminated board 37 is cut into pieces of predetermined size.

(2) Two (2) holes 40 are punched or drilled in the board 37 to serve as external registration marks for aligning operations to be carried out on each side of the laminated board.

(3) Two (2) holes 41 are punched or drilled in the board 37, within the module outline indicated at 42, which align with registration tubes 17 in positioner board 11 or 12.

(4) A coating of suitable resist material is applied to the film side 39 of board 37 except where interconnection pads or dots 43 are desired. The metal side 38 is completely covered with the resist.

(5) A suitable chemical etch is applied to the film side 39 for dissolving the film 39 at the pads or dots 43, thus exposing the metal 38 in a dot pattern as shown in FIG. 8 within the module outline 42.

(6) After appropriate cleaning of side 39 the dots or pads 43 are plated or silk screened with fusible material, for example of the type and in the manner disclosed in U.S. Patent No. 3,150,288 or in either of U.S. patent applications Ser. No. 435,628, filed Feb. 26, 1965, or Ser. No. 442,144, filed Mar. 23, 1965, each assigned to the assignee of this application.

(7) The resist is then removed from the board 37 and suitable resist material is reapplied to the metal side 38 of the board in the desired conductor pattern.

(8) The board 37 is then placed in a suitable chemical etching bath which removes the exposed metal, nickel in this example, leaving a network of circuit paths 44 supported in register on the plastic sheet 39 as shown in FIG. 9.

(9) The circuitry 18, as illustrated in FIGS. 4 and 5, is then defined by removing the material of board 37 from around the module outline 42.

Referring now to FIGS. 4 and 5, and the circuitry 18, constructed in the manner set forth above, is positioned flush with the sides of the module component block assembly 19 by aligning holes 41 in circuitry 18 with registration tubes 17. The circuit paths 44 are welded to the ends of the exposed component leads 29 at the pads 43 by "surface" welding techniques or other suitable methods thereby connecting the circuitry 18 to the encapsulated module components in a manner which produces the desirable mechanical and electrical properties for such interconnections while providing a peelable or repairable connection when desired.

FIGS. 10 and 11 illustrate an enlarged cross-sectional view of the FIG. 9 circuitry 18 showing the coating of fusible material 45 of the dots or pads 43 through which the exposed component leads 29 and the circuit paths 44 are interconnected.

While not illustrated, the above described module assembly procedure may be modified, if desired, by removing a portion of the encapsulated module faces by vapor-blasting leaving the component lead ends protruding slightly above the encapsulant surface, whereby the very small space below the coating 45 of the circuit path pads 43 fits snugly over the lead end. Also etching of the register film at the lead locations can be eliminated by silk screening a diffusion bonding or surface welding material over the lead ends of the cut module face and using welding heat to melt and/or burn the film away as well as make the interconnection.

While the enlarged views of the circuitry 18, as shown in FIGS. 10 and 11, appear to illustrate a large space below the coating 45, in actual practice this space is a matter of micro-inches and does not produce adverse effects on the welding operation inasmuch as the required welding electrode pressure is sufficient to substantially eliminate this space.

For purposes of a more complete understanding of the inventive process a brief description of the surface welding technique utilized therein is set forth, even though such a technique is not part of this invention. Surface welding effects an interface bond between joined members. The two electrodes of the welding machine are positioned on the circuit path directly above a pad 43 and component lead end 29 with a predetermined pressure applied thereto. Energy is then rapidly applied in predetermined quantity through the electrodes, as a result of which heat is rapidly applied to an area localized to the coating 45 disposed intermediate the circuit path 44 and the component lead 29 being joined. The metal of the coating is thereupon caused to diffuse, fuse and coact, creating a bond between the members being joined which is strong in the shear direction but which may be broken in the peel mode and rewelded a number of times without harm to the rewelded joint.

It is thus seen that the present invention provides novel procedures which improve, simplify, and render automatically producible the connections between encapsulated components and associated circuits.

Although particular embodiments and procedures have been illustrated and described, modification and changes will become apparent to those skilled in the art, and it is intended to cover in the appended claims all such modifications as come within the true spirit and scope of the invention.

What we claim is:

1. A method for the assembly of encapsulated electronic modules comprising the steps of positioning the leads of components to be encapsulated in a positioner board means, placing a module frame means around the components, positioning another positioner board means over leads of desired components, locating the positioner board means in the module frame means, encapsulating the components and terminal assembly, inserting a terminal assembly in the module frame means, removing desired portions of the thus assembled module to expose ends of component leads and terminals encapsulated therein, positioning preformed circuitry over the exposed ends, and surface welding the circuitry to the component ends.

2. A method for the assembly of an encapsulated electronic module comprising the steps of providing a positioner board with apertures in an appropriate pattern for positioning component leads relative to each other, inserting component leads in appropriate apertures in the positioner board, certain of said components having leads extending from each end thereof, placing a module frame over the components, the free leads of the components extending through the frame, inserting the free component leads in apertures of a second positioner board, pressing the positioner boards into the module frame, encapsulating the thus assembled module by filling the interior of the frame with suitable material, positioning a terminal assembly in the module frame prior to curing of the encapsulation material, removing portions of desired surfaces of the encapsulated module to expose the ends of the component leads and terminals, placing a preconfigured circuit assembly over the component lead ends, and connecting the component lead ends to desired points in said circuit assembly.

3. A method for the assembly of encapsulated electronic modules comprising the steps of providing a positioner board with apertures in an appropriate pattern for accurately positioning component leads relative to each other and to the sides of the module, inserting leads of components to be encapsulated into the apertures in the positioner board, certain of the components having leads extending in different directions, placing a module frame around the components, providing apertures in a second positioner board in an appropriate pattern, inserting the free component leads in the apertures in the second positioner board, positioning the positioner boards into opposite sides of the frame, encapsulating the thus assembled module, positioning a terminal assembly in the module frame prior to curing of the encapsulation material for encapsulation of terminal members therein, removing portions of the positioner boards and the terminal assembly leaving ends of the component leads and the terminal members exposed, aligning a circuit path assembly over the exposed component ends, and interconnecting the circuit path assembly to each of the component ends.

4. The method defined in claim 3, additionally including the steps of providing additional apertures in the positioner boards and providing apertures in the circuit path assembly to provide a manner for accurate alignment of the circuit path assembly with the exposed component lead ends.

5. The method defined in claim 3, additionally including the step of sealing the component leads within the apertures of the positioner boards prior to encapsulation of the assembled components.

6. The method defined in claim 3, wherein the circuit path assembly includes portions having a fusible material adapted for abutment with the component exposed ends, and wherein the circuit path assembly is interconnected to the exposed component ends by a surface welding technique.

References Cited

UNITED STATES PATENTS

| | | |
|---|---|---|
| 3,134,930 | 5/1964 | Wright. |
| 2,929,965 | 3/1960 | Oden _____ 29—626 X |
| 3,090,706 | 5/1963 | Cado _____ 29—625 X |
| 3,098,950 | 7/1963 | Geshner _____ 29—627 X |
| 3,192,135 | 6/1965 | Robbins _____ 204—11 |
| 3,292,241 | 12/1966 | Carroll _____ 29—625 X |

WILLIAM I. BROOKS, *Primary Examiner.*